US008516453B2

(12) United States Patent
Tripp

(10) Patent No.: US 8,516,453 B2
(45) Date of Patent: Aug. 20, 2013

(54) PARTITION-BASED STATIC ANALYSIS OF COMPUTER SOFTWARE APPLICATIONS

(75) Inventor: Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 12/776,894

(22) Filed: May 10, 2010

(65) Prior Publication Data

US 2011/0276948 A1    Nov. 10, 2011

(51) Int. Cl.
G06F 9/45    (2006.01)
G06F 9/44    (2006.01)

(52) U.S. Cl.
USPC .......................................... 717/140; 717/105

(58) Field of Classification Search
None
See application file for complete search history.

(56) References Cited

U.S. PATENT DOCUMENTS

| 7,281,241 | B2 | 10/2007 | Benoudiz et al. | |
|---|---|---|---|---|
| 2006/0288420 | A1* | 12/2006 | Mantripragada et al. | 726/25 |
| 2007/0038987 | A1* | 2/2007 | Ohara et al. | 717/151 |
| 2008/0320023 | A1* | 12/2008 | Fong | 707/101 |

OTHER PUBLICATIONS

Mariana L. Sharp et al., "Static Analyses for Java in the Presence of Distributed Components and Large Libraries," Dissertation Document from Ohio State University, Computer and Information Science, 2007, pp. 1-150.
Dave Thomas, "Transitive Dependencies," Blog posting on Jan. 28, 2007, 4 pages.
"Build Analysis," Blog posting on Apr. 25, 2009 (Publisher: Kloctalk) 3 pages.
Jackson et al., "Software Analysis: a Roadmap," Proceedings of the Conference on the Future of Software Engineering, 2000, pp. 133-145.
Peter Amey, "Closing the Loop—The Influence of Code Analysis on Design," 7th Ada-Europe International Conference, Vienna, Austria, Jun. 2002, 13 pages.

* cited by examiner

*Primary Examiner* — Hyun Nam
(74) *Attorney, Agent, or Firm* — Holland & Knight LLP; Brian J. Colandreo, Esq.; Jeffrey T. Placker, Esq.

(57) ABSTRACT

Partition-based static analysis of computer software applications may include inspecting each of a plurality of modules of a computer software application to identify at least one dependency of the inspected module on at least one other module of the computer software application, for each of the inspected modules, determining any transitive dependencies of the inspected module from the dependencies identified for the inspected module, performing a first static analysis on one of the inspected modules and its transitive dependencies, and performing a second static analysis on another of the inspected modules and its transitive dependencies, where the first and second analyses may be performed independently from each other.

15 Claims, 3 Drawing Sheets

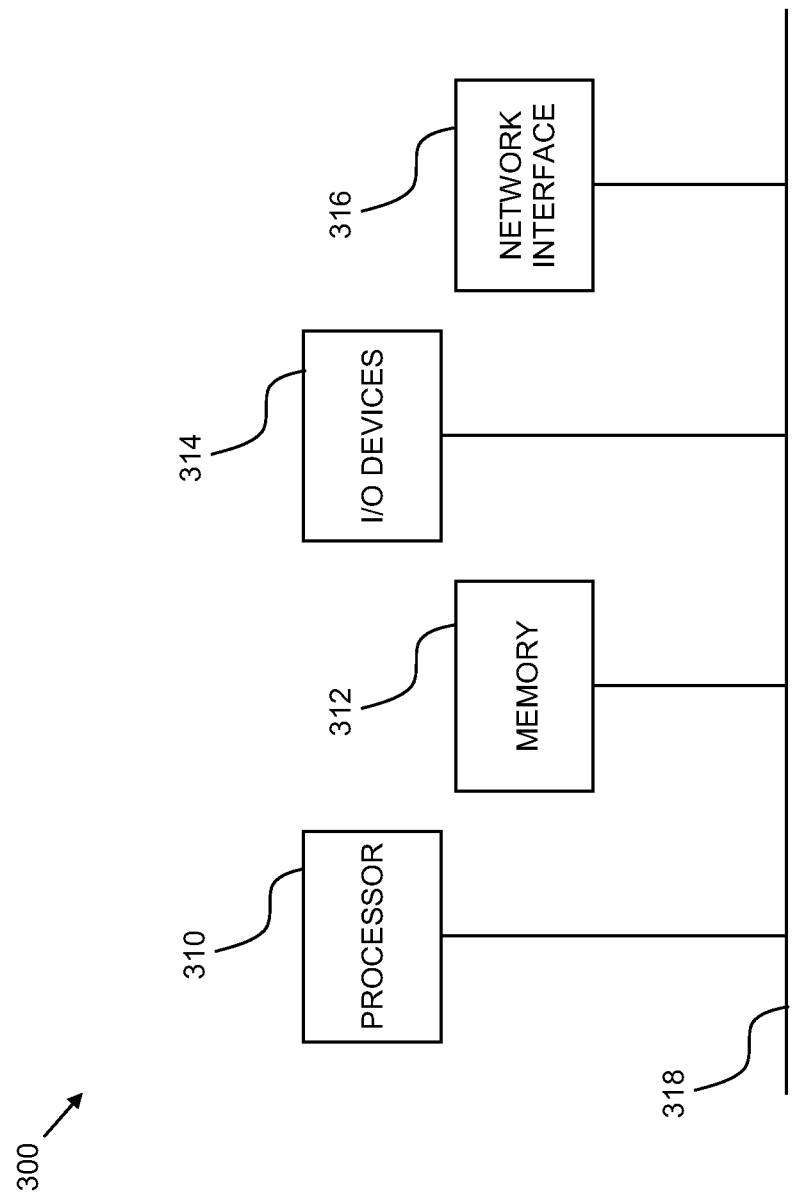

ns, constructed and operative in accordance with an embodiment of the present disclosure;

FIG. 2 is a simplified flowchart illustration of an exemplary method of operation of the system of FIG. 1, operative in accordance with an embodiment of the present disclosure; and FIG. 3 is a simplified block diagram illustrating an exemplary hardware implementation of a computing system, constructed and operative in accordance with an embodiment of the present disclosure.

PARTITION-BASED STATIC ANALYSIS OF COMPUTER SOFTWARE APPLICATIONS

BACKGROUND OF THE INVENTION

The present disclosure relates generally to computer software testing, and more particularly to partitioning computer software applications when performing static analysis thereof.

One of the challenges that may be faced by tools that perform static analysis of computer software applications may be scalability. When performing static analysis on computer software applications with large code bases, static analysis tools may become overwhelmed with information and risk crashing, unless preventive measures are taken. Such measures may involve using coarser forms of analysis whose signal-to-noise ratios may be very low, and thus may be of limited value, or that may employ unsound bounds, and thereby may provide partial and questionable results, particularly when related to testing security or finding bugs. Various heuristics have been proposed to enable static analysis tools to better cope with large computer software applications. However, the use of such heuristics may come at the cost of accuracy and/or precision.

SUMMARY OF THE INVENTION

In one aspect of the present disclosure a system may be provided for partition-based static analysis of computer software applications. The system may include a module inspector configured to inspect each of a plurality of modules of a computer software application to identify at least one dependency of the inspected module on at least one other module of the computer software application, a transitive dependencies identifier configured to determine any transitive dependencies of any of the inspected modules from the dependencies identified for the inspected module, and a static analyzer configured to perform a first static analysis on one of the inspected modules and its transitive dependencies, and perform a second static analysis on another of the inspected modules and its transitive dependencies. The static analyzer may be configured to perform the first and second analyses independently from each other. The module inspector, transitive dependencies identifier, and static analyzer may be implemented in at least one of computer hardware and computer software embodied in a physically-tangible computer-readable storage medium.

In another aspect of the present disclosure a method may provided for partition-based static analysis of computer software applications. The method may include inspecting each of a plurality of modules of a computer software application to identify at least one dependency of the inspected module on at least one other module of the computer software application, for each of the inspected modules, determining any transitive dependencies of the inspected module from the dependencies identified for the inspected module, performing a first static analysis on one of the inspected modules and its transitive dependencies, and performing a second static analysis on another of the inspected modules and its transitive dependencies. The first and second analyses may be performed independently from each other. A computer program product may also be provided.

DETAILED DESCRIPTION OF THE INVENTION

Figure 1:
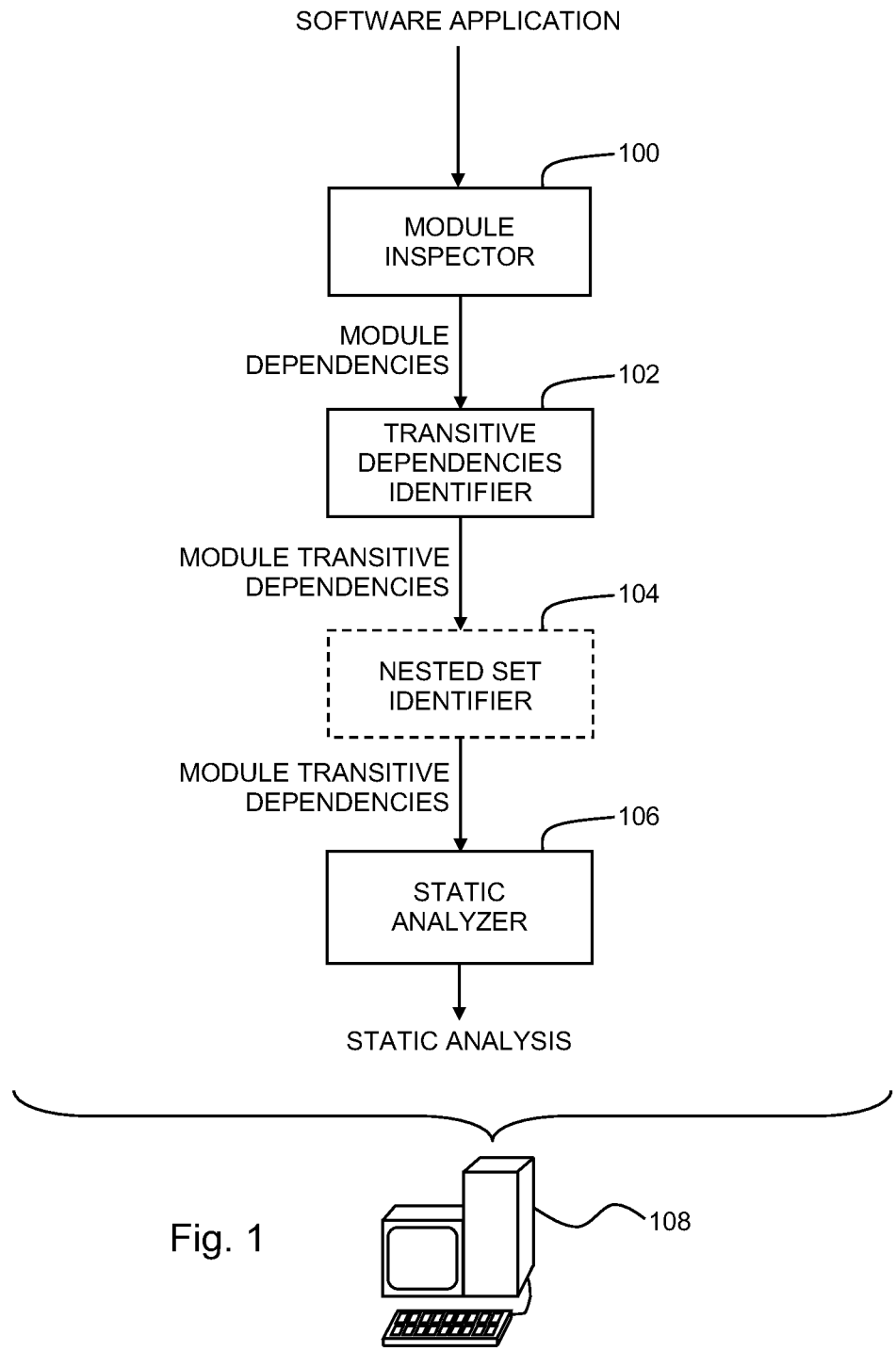
FIG. 1 is a simplified conceptual illustration of a system for partition-based static analysis of computer software applica-

This disclosure may now be described within the context of one or more embodiments. Although the description may be illustrative of the invention as a whole, it is not intended to be construed as limiting the invention to the embodiments shown. It may be appreciated that various modifications may occur to those skilled in the art that, while not specifically shown herein, are intended to be within the true spirit and scope of the invention.

As may be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which may be a simplified conceptual illustration of a system for partition-based static analysis of computer software applications, constructed and operative in accordance with an embodiment of the invention. In the system of FIG. 1, a module inspector 100 may be configured to inspect any, and in some implementations every, module of a computer software application to identify other modules of the software application on which each inspected module depends. A "module" as used herein may represent any predefined type of portion of a computer software application, such as, but not limited to, a procedure, a function, a class, and a file, such as a .DLL file. An inspected module may be said to be dependent on another module if the inspected module calls the other module or otherwise references any element found within the other module. Using conventional dependency analysis techniques module inspector 100 may compile a dependency set of inspected modules identifying each inspected module and its associated dependencies, and may provide the dependency set to a transitive dependencies identifier 102 which may be configured to determine the transitive dependencies of any, and in some implementations every, inspected module of the computer software application. Using conventional transitive dependency analysis techniques, transitive dependencies identifier 102 may compile a transitive dependency set of inspected modules identifying each inspected module and its associated transitive dependencies. Each inspected module in the transitive dependency set may now be referred to as a "root" module with respect to its associated transitive dependencies. An optional nested set identifier 104, shown in dashed lines, may remove from the transitive dependency set any root module where the root module may itself be counted among the transitive dependencies of another root module. The transitive dependencies set of each root module and its associated transitive dependencies may be provided to a static analyzer 106, which may be configured to perform static analysis in accordance with conventional static analysis techniques, but separately on each root module and its associated transitive dependencies. Thus, static analysis may be performed on one root module and its associated transitive dependencies independently from performing static analysis on another root module and its associated transitive dependencies.

Any of module inspector 100, transitive dependencies identifier 102, nested set identifier 104, and static analyzer 106 may be implemented as a computer program product embodied in a computer-readable medium, such as in the form of computer program instructions stored on magnetic, optical, or other physical storage media or embedded within computer hardware, and may be executed by one or more computers, such as by a computer 108.

Figure 2:
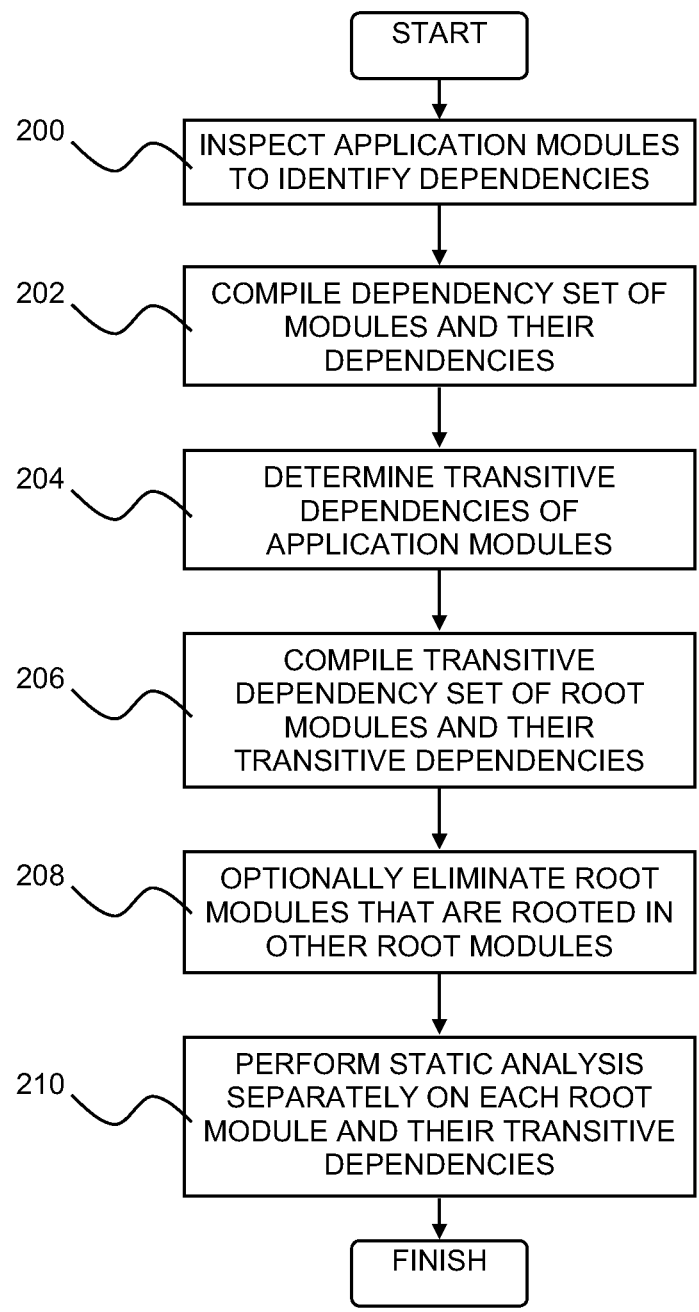

Reference is now made to FIG. 2, which may be a simplified flowchart illustration of an exemplary method of operation of the system of FIG. 1, operative in accordance with an embodiment of the invention. In the method of FIG. 2, any, and in some implementations every, module of a computer software application may be inspected to identify other modules of the software application on which each inspected module may depend (200). A dependency set may be compiled of inspected modules which may identify each inspected module and its associated dependencies (202). The transitive dependencies of any, and in some implementations every, inspected module of the computer software application may be determined from the dependency set (204). A transitive dependency set may be compiled of inspected modules identifying each root module and its associated transitive dependencies (206). Optionally, any root modules that may be counted among the transitive dependencies of another root module may be removed from the transitive dependency set (208). Static analysis may be separately performed on each root module and its associated transitive dependencies (210).

The system and method of FIGS. 1 and 2 may be understood within the context of the following exemplary scenario. In the table below, a computer software application may be divided into software modules A-H, whose dependencies may be listed as follows:

| MODULE | DEPENDENCIES | |
|--------|--------------|---|
| A | B | C |
| B | C | |
| C | G | |

| MODULE | DEPENDENCIES | |
| --- | --- | --- |
| D | B | F |
| E | F | |
| F | H | |
| G | | |
| H | | |

The set of transitive dependencies may be determined for each module as follows. A, for example, may depend on B and C. B may depend on C, C may depend on G, and G may have no dependencies. Thus, A's transitive dependencies may be B, C, and G, while B's transitive dependencies may be C, and G. The set of transitive dependencies for each root module may be as follows:

| ROOT MODULE | TRANSITIVE DEPENDENCIES | | | |
| --- | --- | --- | --- | --- |
| A | B | C | G | |
| B | C | G | | |
| C | G | | | |
| D | B | C | F | G | H |
| E | F | H | | |
| F | H | | | |
| G | | | | |
| H | | | | |

Optionally, any root module that may be counted among the transitive dependencies of another root module may be removed from the transitive dependency set. Thus, for example, since B may be rooted in C and G, B may be eliminated as a root module. Similarly, C, G, F, and H may be eliminated as root modules, which may leave:

| ROOT MODULE | TRANSITIVE DEPENDENCIES | | | |
| --- | --- | --- | --- | --- |
| A | B | C | G | |
| D | B | C | F | G | H |
| E | F | H | | |

The computer software application in this example may thus have been partitioned into three groups of modules. Static analysis may then be performed on root module A and its transitive dependencies, separately on root module D and its transitive dependencies, and separately on root module E and its transitive dependencies. It may thus be appreciated that the present disclosure may be employed to partition a computer software application into multiple partitions of software application modules, and may allow static analysis to be performed separately and independently on each partition, while it may also ensure at the same time that static analysis may be performed on all of the modules.

The system and method of FIGS. 1 and 2 may likewise be understood within the context of the following exemplary scenario, where a computer software application may include various software modules in the form of classes and interfaces as follows:

Application:

```
Class C1 {
    public void foo( ) {
        I i = getI( );
        i.bar( );
    }
    public I getI( ) {
        return new T1( );
    }
}
Class C2 {
    public void foo2( ) {
        I i = getI( );
        i.bar( );
    }
    public I getI( ) {
        return new T2( );
    }
}
```

Library1:

```
Class T1 : I {
    public void bar( ) {
        ...
    }
}
```

Library2:

```
Class T2 : I {
    public void bar( ) {
        ...
    }
}
```

Library3:

```
Interface I {
    void bar( );
}
```

In this example, dependency analysis may reveals that C1 may depend on T1, and similarly, that C2 may depend on T2. By applying the operations in accordance with the disclosure described herein, the application may be partitioned into two distinct sub-scopes, {C1, Library1, Library3} and {C2, Library2, Library3}. By performing static analysis separately on each sub-scope rather than on the entire application scope, the precision of the analysis may be improved. This may be seen by considering the judgment the static analysis may make over the possible resolutions of the call to bar( ). Using one scope for the entire application, the analysis might be over-conservative and determine that at the points where bar( ) may be called, the receiver may be either of type T1 or of type T2. However, if the application is first partitioned into the indicated sub-scopes, such conservativeness may be avoided, resulting in a more precise and scalable analysis that does not compromise its soundness.

Referring now to FIG. 3, block diagram 300 may illustrate an exemplary hardware implementation of a computing system in which one or more components/methodologies of the present disclosure (e.g., components/methodologies which may be described in the context of the drawing figures shown and described herein) may be implemented.

As shown, the techniques for controlling access to at least one resource may be implemented in accordance with a processor 310, a memory 312, I/O devices 314, and a network interface 316, coupled via a computer bus 318 or alternate connection arrangement.

It may be appreciated that the term "processor" as used herein may be intended to include any processing device, such as, for example, one that includes a CPU (central processing unit) and/or other processing circuitry. It may also be understood that the term "processor" may refer to more than one processing device and that various elements associated with a processing device may be shared by other processing devices.

The term "memory" as used herein may include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein may include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it may be appreciated that the methods and apparatus described herein may be readily implemented in computer hardware or software using conventional techniques.

While the invention may have been described with reference to one or more specific embodiments, the description may be illustrative of the invention as a whole and may not be construed as limiting the invention to the embodiments shown. It may be appreciated that various modifications may occur to those skilled in the art that, while not specifically shown herein, and are intended to be within the true spirit and scope of the invention.

What is claimed is:

1. A computing system for partition-based static analysis of computer software applications, the computing system comprising:
    at least one processor;
    at least one memory architecture coupled with the at least one processor;
    a module inspector configured to inspect each of a plurality of modules of a computer software application to identify at least one dependency of said inspected module on at least one other module of said computer software application;
    a transitive dependencies identifier configured to determine any transitive dependencies of any of said inspected modules from said dependencies identified for said inspected module; and
    a static analyzer configured to:
        perform a first static analysis on one of said inspected modules and its transitive dependencies;
        perform a second static analysis on another of said inspected modules and its transitive dependencies, wherein said static analyzer is configured to perform said first and second analyses independently from each other; and
        wherein said module inspector, transitive dependencies identifier, and static analyzer are implemented in at least one of computer hardware and computer software embodied in a physically-tangible computer-readable storage medium.

2. The computing system of claim 1 wherein any of said modules is a predefined type of portion of said computer software application.

3. The computing system of claim 2 wherein said predefined type of portion is at least one of a procedure, a function, a class, a file other than a .DLL file, and a .DLL file.

4. The computing system of claim 1 wherein said module inspector is configured to compile a dependency set of said inspected modules identifying each of said inspected modules and its associated dependencies.

5. The computing system of claim 1 wherein said transitive dependencies identifier is configured to compile a transitive dependency set of said inspected modules identifying each of said inspected modules as a different root module, and identifying each of said root modules and its associated transitive dependencies.

6. The computing system of claim 5 further comprising a nested set identifier configured to remove from said transitive dependency set any of said root modules that are counted among said transitive dependencies of any other of said root modules.

7. A method for partition-based static analysis of computer software applications, the method comprising:
    inspecting each of a plurality of modules of a computer software application to identify at least one dependency of said inspected module on at least one other module of said computer software application;
    for each of said inspected modules, determining any transitive dependencies of said inspected module from said dependencies identified for said inspected module;
    performing a first static analysis on one of said inspected modules and its transitive dependencies; and
    performing a second static analysis on another of said inspected modules and its transitive dependencies, wherein said first and second analyses are performed independently from each other.

8. The method of claim 7 further comprising:
    compiling a dependency set of said inspected modules identifying each of said inspected modules and its associated dependencies.

9. The method of claim 7 further comprising:
    compiling a transitive dependency set of said inspected modules identifying each of said inspected modules as a different root module, and identifying each of said root modules and its associated transitive dependencies.

10. The method of claim 9 further comprising:
removing from said transitive dependency set any of said root modules that are counted among said transitive dependencies of any other of said root modules.

11. The method of claim 7 wherein said inspecting, determining, and performing operations are implemented in at least one of computer hardware configured to perform said operations and computer software embodied in a tangible, computer-readable storage medium.

12. A computer program product for partition-based static analysis of computer software applications residing on a non-transitory computer readable medium, having a plurality of instructions stored thereon, which, when executed by a processor, cause the processor to perform operations to:
inspect each of a plurality of modules of a computer software application to identify at least one dependency of said inspected module on at least one other module of said computer software application;
for each of said inspected modules, determine any transitive dependencies of said inspected module from said dependencies identified for said inspected module;
perform a first static analysis on one of said inspected modules and its transitive dependencies; and
perform a second static analysis on another of said inspected modules and its transitive dependencies, wherein said first and second analyses are performed independently from each other.

13. The computer program product of claim 12 wherein said computer-readable program code is further configured to compile a dependency set of said inspected modules identifying each of said inspected modules and its associated dependencies.

14. The computer program product of claim 12 wherein said computer-readable program code is further configured to compile a transitive dependency set of said inspected modules identifying each of said inspected modules as a different root module, and identifying each of said root modules and its associated transitive dependencies.

15. The computer program product of claim 14 wherein said computer-readable program code is further configured to remove from said transitive dependency set any of said root modules that are counted among said transitive dependencies of any other of said root modules.

* * * * *